No. 774,856. PATENTED NOV. 15, 1904.
B. S. SUMMERS.
APPARATUS FOR RETTING VEGETABLE FIBERS.
APPLICATION FILED NOV. 21, 1900.
NO MODEL. 3 SHEETS—SHEET 2.
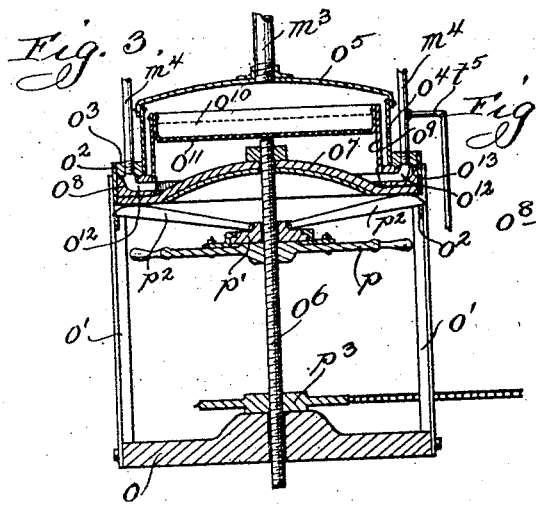
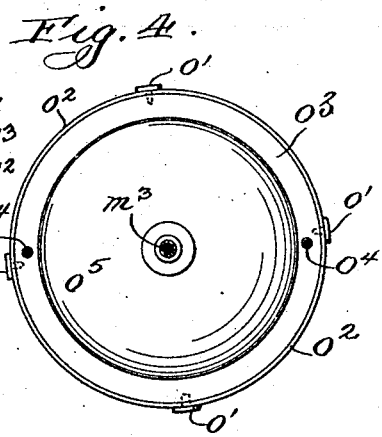
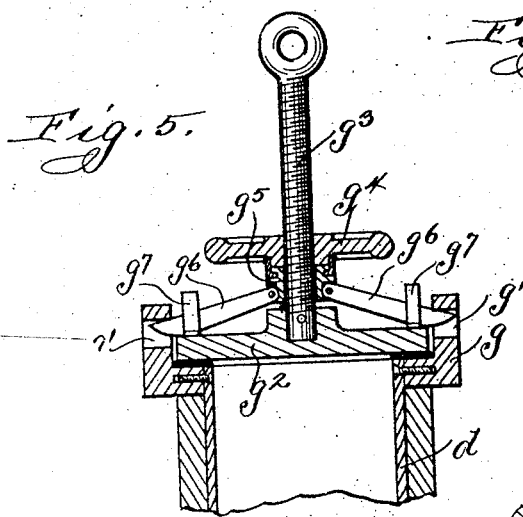
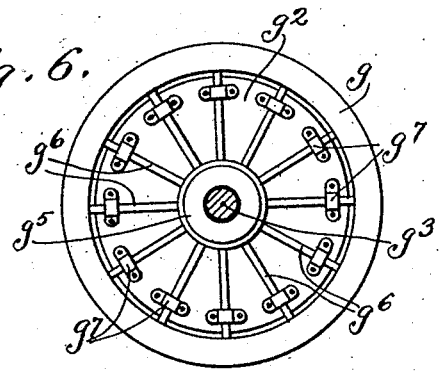
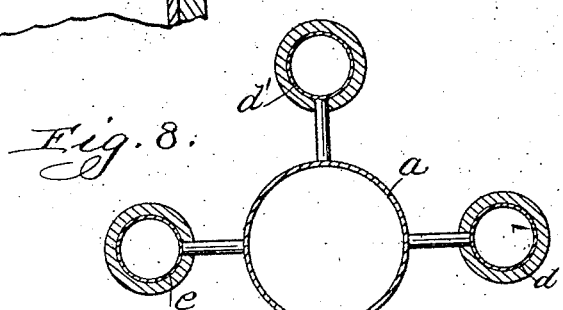
Witnesses:
R. J. Jacker.
J. D. Chubb.
Inventor:
Bertrand S. Summers
By Jones & Addington
Attorneys.

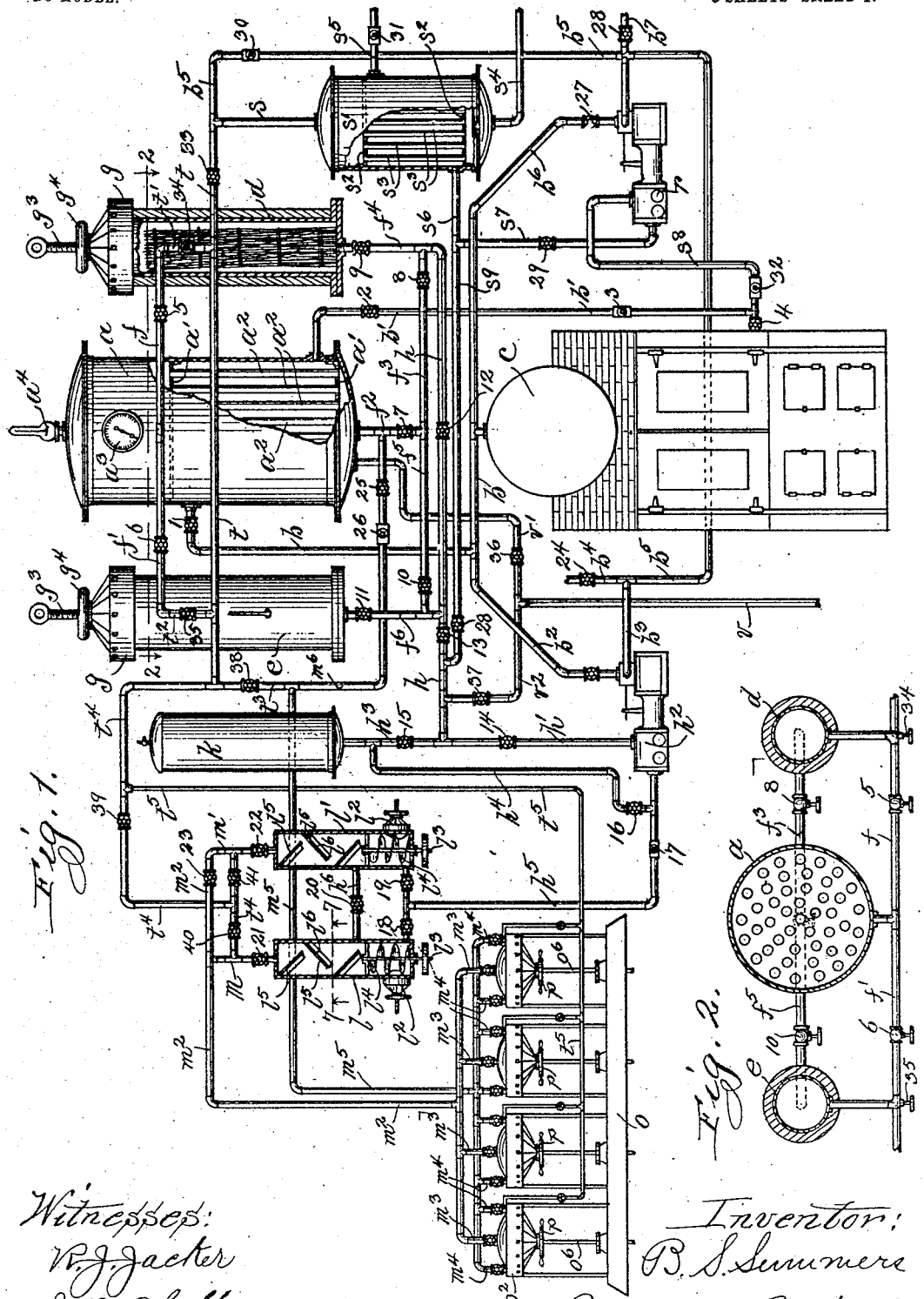

No. 774,856. PATENTED NOV. 15, 1904.
B. S. SUMMERS.
APPARATUS FOR RETTING VEGETABLE FIBERS.
APPLICATION FILED NOV. 21, 1900.
NO MODEL. 3 SHEETS—SHEET 3.
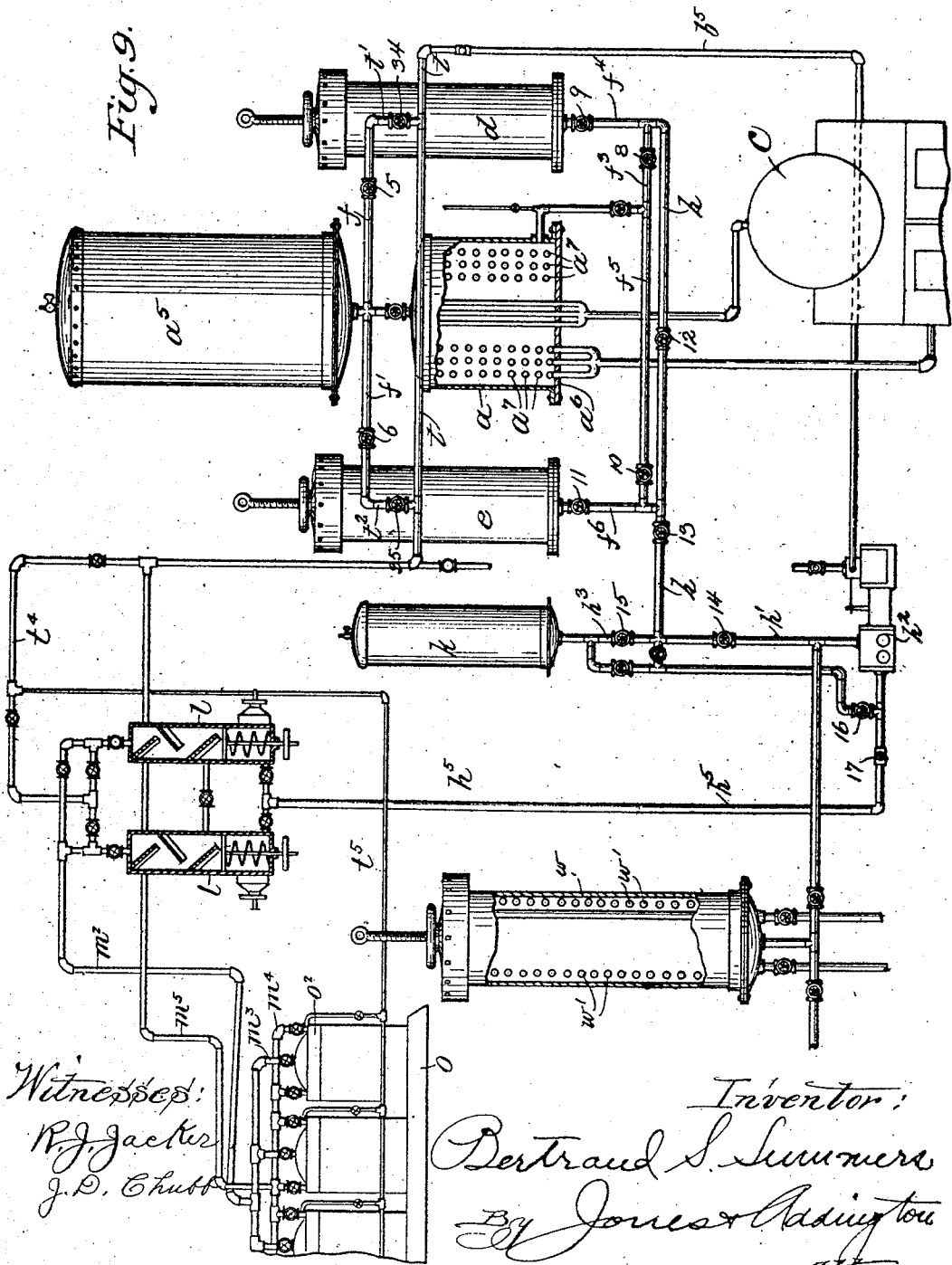

No. 774,856. Patented November 15, 1904.

UNITED STATES PATENT OFFICE.

BERTRAND S. SUMMERS, OF CHICAGO, ILLINOIS.

APPARATUS FOR RETTING VEGETABLE FIBERS.

SPECIFICATION forming part of Letters Patent No. 774,856, dated November 15, 1904.

Application filed November 21, 1900. Serial No. 37,311. (No model.)

*To all whom it may concern:*

Be it known that I, BERTRAND S. SUMMERS, a citizen of the United States, residing at Chicago, in the county of Cook and State of Illinois, have invented a certain new and useful Improvement in Apparatus for Retting Vegetable Fibers, of which the following is a full, clear, concise, and exact description, reference being had to the accompanying drawings, forming a part of this specification.

My invention relates to apparatus for retting and preparing vegetable fibers, my object being to provide an improved and efficient form of apparatus whereby such fibers may be subjected to the action of a retting solution and, moreover, to provide means whereby the retting solution may be renewed and prepared for use in the further retting of fibers.

In an application filed by me November 16, 1900, Serial No. 36,398, I have described and claimed a process of retting vegetable fibers, and the apparatus shown, described, and claimed in the present application has been particularly designed for employment in connection with said retting process. The apparatus and component parts thereof are, however, adapted to other purposes and uses.

The process of retting vegetable fibers described and claimed in the application above mentioned I will now describe briefly in order that the apparatus of the present invention may be more readily understood: The fibers are retted by subjecting them to a retting liquid formed by subjecting a quantity of fibers to water under heat and pressure, thereby extracting from the fibers any cementing-gums and also certain ingredients of an oily and waxy nature which are known to lend tone and quality to the fiber. The resulting liquid is subjected to chemicals which precipitate the cementing-gums, while not affecting the ingredients of an oily and waxy nature, which remain in solvent relation to the liquid. The precipitated gums are then filtered off, and the resulting liquid is that employed for commercially retting the fibers. The fibers to be commercially retted are subjected to this retting liquid, and the cementing-gums are thereby removed from the fibers, while the ingredients of a waxy and oily nature are not removed from the fibers, due to the fact that the retting liquid has its solvent avidity for these oily and waxy ingredients already satisfied. The retting liquid is from time to time filtered to remove the gums thus extracted from the vegetable fibers, and in conducting this filtering process I first subject the retting liquid to a precipitating chemical in an agitating-chamber, whereby the chemical is thoroughly mixed with the retting liquid to effectively precipitate the gum. The retting liquid and the precipitate are then passed from the agitating-chamber to the filter, where the percipitate is separated from the retting liquid. The retting liquid as thus renewed is ready for use again in the further retting of vegetable fibers.

In accordance with my invention in the preferred form thereof illustrated and described herein for disclosing the nature of my invention I provide a heater in which the retting solution is adapted to be heated, said heater being associated with one or more digesters in which the fiber to be retted is placed, the digester being connected with the heater, so that the retting solution may be readily passed back and forth between the heater and the digester. I preferably arrange the digester relatively to the heater so that a continuous circulation of the retting solution may take place from the heater to the digester and back again to the heater.

I also provide means whereby the retting solution after the same has operated upon the fiber and has absorbed the gum therefrom may be passed through apparatus adapted to extract the gum from the retting solution, whereby the retting solution may be renewed for further employment in retting. My invention in this respect preferably consists of an agitator in which the retting solution is thoroughly intermingled with a precipitant material, the agitator being constructed so that the solution carrying the precipitated gum may pass therefrom to a filter, while the precipitating material is retained in the agitating-chamber.

I do not claim herein the filters in their individual capacity, as I shall probably make the same the subject-matter of a divisional application. I have illustrated said filters in the present application for the purpose of showing the construction and operation of the complete system, and it will be understood that I do not by so doing dedicate the same to the public, but expressly reserve the subject-matter of said filter in its individual capacity for said divisional application.

I have illustrated my invention in the accompanying drawings, in which—

Figure 1 is a view illustrating the complete system of my invention. Fig. 2 is a sectional view on line 2 2, Fig. 1. Fig. 3 is a sectional view of the filter. Fig. 3$^a$ is a detail view of a portion of the filter. Fig. 4 is a top view of the filter. Fig. 5 is a view of the removable head of the digester. Fig. 6 is a top view of the removable head of the digester, partially in section. Fig. 7 is a sectional view on line 7 7, Fig. 1. Fig. 8 is a plan view, partially in section, showing the manner of associating a plurality of digesters with a single heater; and Fig. 9 is a view of a modified form of my invention.

Like characters refer to like parts in the several figures.

The heater $a$ is provided near the upper and lower ends with plates $a'$ $a'$, having holes provided therethrough into which extend the ends of the tubes $a^2$ $a^2$. A pipe $b$ extends from the boiler $c$ to the interior of the heater $a$ at a point between the plates $a'$ $a'$, and a pipe $b'$ extends from the space between said plates $a'$ $a'$ back to the boiler, whereby steam may circulate around the tubes $a^2$ $a^2$ and heat the same. The pipe $b$ is controlled by a valve 1, and pipe $b'$ is controlled by a valve 2. In the pipe $b'$ a check-valve 3 is also provided, and a valve 4 controls the connection of the end of the pipe $b'$ with the boiler.

Upon opposite sides of the heater $a$ are the digesters $d$ $e$. The digester $d$ is connected at the upper end with the upper end of the heater above the plate $a'$ by means of a pipe $f$, and the upper end of the digester $e$ is connected with the upper end of said heater by means of the pipe $f'$. A valve 5 controls the pipe $f$, and a valve 6 controls the pipe $f'$. The lower end of the heater is connected with the lower end of the digester $d$ by means of the pipes $f^2$ $f^3$ $f^4$, and the lower end of the heater is connected with the lower end of the digester $e$ by means of pipes $f^2$ $f^5$ $f^6$. These pipes are controlled by the valves 7, 8, 9, 10, and 11.

The heater $a$ is provided with a pressure-gage $a^3$ to indicate the pressure therein and is provided at the top with a pop-valve $a^4$, which yields to an excessive pressure in the heater, whereby the pressure within the heater may be prevented from rising above a prearranged value.

The upper ends of the digesters $d$ and $e$ are provided with removable covers. (Shown in detail in Figs. 5 and 6.) The digester is provided at the upper end with a rim $g$ having a plurality of holes $g'$ $g'$ at intervals. The head $g^2$ of the digester carries a threaded bolt or rod $g^3$, upon which is threaded a hand-wheel $g^4$. Moving freely upon the rod $g^3$ is a block $g^5$, engaging the wheel $g^4$ in such a manner that as the wheel rises or falls the block $g^5$ moves therewith. A plurality of arms $g^6$ $g^6$ are pivoted at one end to the block $g^5$ and are of wedge form at the free ends, which are guided by the guides $g^7$ $g^7$. The ends of the arms $g^6$ $g^6$ extend into the openings $g'$ $g'$ in the rim $g$, and as the wheel $g^4$ is screwed downward the arms $g^6$, acting upon the upper walls of the holes $g'$ as a fulcrum, wedge the head $g^2$ firmly upon the top of the digester. By screwing the wheel $g^4$ upward the arms $g^6$ are caused to release the head $g^2$. By the further movement of said wheel $g^4$ the ends of the arms $g^6$ are withdrawn entirely from the holes $g'$, and the head $g^2$ may then be removed bodily from the digester. Instead of employing this particular form of removable head any other desired form may be employed.

During the retting operation a bundle of the fibers to be operated upon is placed in each of the digesters $d$ $e$, as shown in connection with the digester $d$ which is illustrated in section, and the valves 5, 6, 7, 8, 9, 10, and 11 are opened. The solution filling the heater $a$ will pass into the digesters, and as the solution is heated by means of the steam circulating about the pipes $a^2$ the retting solution will circulate, rising through the heater, thence passing to the digesters, and returning to the heater through the pipe at the lower end thereof. When the fiber has been subjected to the retting solution for a sufficient length of time, the valves between the heater and the digesters may be closed, and the removable heads of the digesters may then be lifted and the fiber removed from the digesters. A fresh batch of the fiber may then be placed in position and the operation repeated.

After the retting solution has been used for a period of time it becomes filled with gum removed from the fibers and it is necessary in accordance with the process described in my application above referred to to draw off the retting solution and to precipitate the gum therefrom. I will now describe the apparatus which I employ for drawing off the solution and for precipitating and filtering the same.

A pipe $h$ connects pipes $f^4$ $f^6$ with a pipe $h'$, extending to the pump $h^2$. A pipe $h^3$ connects the pipe $h$ with a reservoir $k$. Valves 12 and 13 are provided in the pipe $h$, and the pipes $h'$ and $h^3$ are provided with the valves 14 and 15, respectively. The discharge end of the pump $h^2$ is connected, by means of pipe $h^4$, with pipe $h^3$, a valve 16 being provided therein. The discharge end of the pump $h^2$ is also connected, by means of pipe $h^5$, with the agitating-chambers $l$ $l'$, a check-valve 17 being provided in this pipe $h^5$ and valves 18 and 19 being provided between said pipe $h^5$ and the respective agitators $l$ $l'$. The agitators are connected by means of a pipe $h^6$, provided with a valve 20. The upper ends of the agitating-chambers are connected by pipes $m$ $m'$ with the pipe $m^2$, the pipes $m$ $m'$ being controlled by the valves 21 and 22, respectively, and pipe $m^2$ being controlled by the valve 23. The solution from either of the digesters may be pumped from the digester directly to the agitating-chambers $l$ $l'$, or the solution may be first stored in the reservoir $k$ and subsequently pumped into the agitators. When it is desired to pump the solution from one of the digesters—say digester $d$—into the reservoir $k$, the digester is disconnected from the heater by closing the valves 5 and 8, and the valves 9, 12, 13, 14, and 16 are then opened, the valve 15 remaining closed. The solution is then pumped from the digester $d$ through pipes $h$, $h'$, and $h^4$ into the reservoir $k$. If it be desired to pump the solution from the digester $d$ directly into the agitators $l$ $l'$, the valves 9 12 13 14 18 19 are opened, the valve 16 remaining closed. The solution is thus pumped through the pipes $h$, $h'$, and $h^5$ into the agitators. When it is desired to pump the solution from the reservoir $k$ into the agitators, the valves 14, 15, 18, and 19 are opened, the valve 16 remaining closed. The solution is thus pumped from the reservoir $k$ through the pipes $h^3$, $h'$, and $h^5$ into the agitators.

The pump $h^2$ is supplied by steam through the pipe $b^2$, the exhaust passing by pipe $b^3$ to the atmosphere through pipe $b^4$ or for further use through the pipe $b^5$, as hereinafter described. The valve 24 controls the pipe $b^4$.

The agitating-chambers $l$ $l'$ are each made, preferably, cylindrical in form, having upon the side near the lower end a removable head $l^2$, similar to the removable heads upon the digesters. Passing through the lower end of the agitator is a shaft $l^3$, which may be rotated in any desired manner, and this shaft carries a screw conveyer $l^4$. The upper end of the shaft $l^3$ is supported in any desired manner. The precipitating material, preferably litharge, as more particularly set forth in the application above referred to, is provided upon the blades of the conveyer, and as the solution enters the lower end of the agitator and passes upward, due to the current produced by the screw conveyer, the solution is brought into intimate contact with the litharge, and the gum is precipitated and remains suspended in the solution as a precipitate. Above the conveyer a plurality of baffling-plates $l^5$ are provided, these plates being of the form more clearly shown in Fig. 7 and extending downward, so that as the solution passes upward its direction of movement is reversed repeatedly and is forced to partake of a sinuous path in passing from the agitating-chamber. The litharge which would otherwise be carried from the chamber is thus thrown out of the solution, due to the repeated reversal in the direction of movement of the solution. Moreover, the screw conveyer imparts to the liquid a whirling motion, and the lower faces of the baffling-plates are provided with blades $l^6$, which tend to check this whirling motion, thereby further assisting in throwing the litharge from the solution. By means of the removable head $l^2$ access may be gained to the interior of the agitating-chamber for the insertion and removal of the precipitating material.

The retting solution, carrying in suspension the precipitated gum, passes through pipe $m^2$ to the filter. In the drawings I have shown four of these filters placed in parallel. In practice I prefer to employ a number of filters, although one may be used. Pipe $m^2$ branches into a number of pipes $m^3$ $m^3$, each leading into the top of one of the filtering-chambers. The filter is shown in detail in Figs. 3, $3^a$, and 4 and comprises a base-plate $o$, carrying upright standards $o'$ $o'$, supporting upon the upper end the rim $o^2$, upon the inner wall of which is carried a ring $o^3$. Upon the inner wall of the ring $o^3$ is carried an annular casing $o^4$, having secured thereto a top plate $o^5$, through which passes the pipe $m^3$. Passing freely through an opening in the base $o$ is a threaded rod $o^6$, to which is secured at the upper end the removable head $o^7$ of the filter. The body of this head is arched in form, and upon the upper face thereof at the outer edge is carried an annular ring $o^8$, the inner wall of which supports an annular rim $o^9$, carrying at the upper end a pan $o^{10}$, provided with a perforated bottom $o^{11}$. The upper end of the threaded rod $o^6$ rests against the under face of the bottom $o^{11}$ to serve as a support therefor. The exit-pipes $m^4$ $m^4$, passing through the ring $o^3$ and passages $o^{12}$ $o^{12}$ communicating therewith, are provided in the ring $o^8$. In the upper surface of the ring $o^8$ and surrounding the opening communicating with the pipes $m^4$ are circular channels $o^{13}$, (shown in cross-section in Fig. 3 and in plan in Fig. $3^a$,) and gaskets are placed in these channels, whereby when the ring $o^8$ is pressed against the ring $o^3$ the leakage of the liquid past the joint will be effectively prevented. Upon the threaded rod $o^6$ a hand-wheel $p$ is provided, carrying a block $p'$, adapted to move longitudinally therewith, while sliding freely upon the rod $o^6$. To the block $p'$ are hinged the arms $p^2$ $p^2$, the ends of which are wedge shape and adapted to fit in openings provided in the rim $o^2$. These arms are similar to those provided in connection with the removable heads of the digesters, and when the hand-wheel $p$ is rotated to move the same upward the head $o^7$ is moved upward to carry the ring $o^8$ thereon firmly into contact with the under surface of the ring $o^3$. When the hand-wheel $p$ is turned to move the same downward, the arms $p^2$ are withdrawn from the opening in the rim $o^2$ and the cover is unlocked, and by then rotating by any suitable means the wheel $p^3$, which is threaded upon the rod $o^6$, the rod may be moved downward, carrying with it the head $o^7$ and the pan $o^{10}$ carried thereon. The pan $o^{10}$ is adapted to be filled with filtering material, such as asbestos, the filtering material extending to the height indicated by the dotted line. By rotating the wheel $p^3$ in the opposite direction the head may be moved upward to the normal position, and by means of the wheel $p$ the head may be locked in position.

The solution entering by the pipe $m^3$ passes downward through the filtering material and through the openings in the perforated plate $o^{11}$ and thence passes outward through the exit-pipes $m^4$ $m^4$. The pipes $m^4$ are connected with a pipe $m^5$, which extends to a pipe $m^6$, which latter pipe is connected with the pipe $f^2$, entering the bottom of the heater. The pipe $m^6$ is controlled by a valve 25 and a check-valve 26. By means of the pipes $m^5$ and $m^6$ the filtered solution may be returned to the heater. Valves are provided in the pipes $m^3$ and $m^4$ for controlling the passage of the liquid therethrough.

I have illustrated upon the right of the boiler a feed-water pump $r$, adapted to receive steam from the boiler through the pipe $b^6$, controlled by the valve 27. The exhaust from the pump is delivered to the pipe $b^5$. The pipe $b^5$ in the vicinity of the pump $r$ is provided with a spur $b^7$, controlled by the valve 28, whereby the exhaust-steam may be admitted to the atmosphere. The pipe $b^5$, connected with the exhaust, extends to pipe $s$, which opens into the upper end of the feed-water heater $s'$, having plates $s^2$ $s^2$ at the upper and lower ends joined by tubes $s^3$ $s^3$. The exhaust-steam having passed through the feed-water heater $s'$ and through the tubes $s^3$ $s^3$ thereof passes, by means of pipe $s^4$, to a condenser for condensing the water for use in retting or to a drier for drying the fiber or may be exhausted into the atmosphere. The feed-water for the boiler passes by pipe $s^5$ to the space between the plates $s^2$ $s^2$ of the feed-water heater, and pipes $s^6$ $s^7$ extend from this space to the pump $r$. The discharge-pipe $s^8$ of the pump $r$ extends to the boiler. A pipe $s^9$ is connected between the pipes $s^6$ and $h$, whereby the water may be admitted to the heater and digesters, this pipe $s^9$ being controlled by a valve 28. A valve 29 is provided in the pipe $s^7$, and check-valves 30, 31, and 32 are provided in the pipes $b^5$, $s^5$, and $s^8$, respectively.

With the pipe $b^5$ a pipe $t$ is connected, said pipe being controlled by a valve 33. The pipe $t$ is connected with the pipe $f$ by means of a pipe $t'$, containing a valve 34, and with the pipe $f'$ by means of a pipe $t^2$, having a valve 35. By means of these pipes the digesters may be connected with the exhaust to blow off the steam therein and lower the pressure when it is desired to open the digester. A pipe $v$, extending to the sewer, is connected, by means of pipe $v'$, with the inner side of the heater and by means of pipe $v^2$ with pipe $h$, whereby the same may be placed in communication with the digesters. The pipe $v'$ is controlled by a valve 36 and the pipe $v^2$ by a valve 37. The pipe $t$ is connected by pipe $t^3$ with the pipes $m^5$ and $m^6$, the pipe $t^3$ being controlled by valve 38. Likewise the pipe $t$ is connected by a pipe $t^4$ with the pipes $m$ $m'$, pipe $t^4$ being controlled by valves 39, 40, and 41. The pipe $t^5$ extends from the pipe $t^4$ to the several filters, whereby the said filters may be connected with the exhaust when it is desired to lower the pressure therein in order to open the filters.

In Fig. 8 I have illustrated four digesters $d$ $e$ $d'$ $e'$ connected with a single heater $a$. In like manner any desired number of digesters may be connected with a single heater.

In Fig. 9 I have illustrated a modification of my invention wherein a reservoir or storing-tank $a^5$ is provided above the heater $a$, the storing-tank $a^5$ forming, in effect, the upper portion of the heater. The lower end $a^6$ of the heater carries the coils $a^7$, adapted to be connected with the boiler. By removing the bolts securing the bottom $a^6$ in position the said bottom, with the coils mounted thereon, may be removed from the casing of the heater. The coils may thus be removed from the heater to clean the same, since the retting solution tends in time to make a deposit on the exterior of the pipes. The reservoir $a^5$ should be made of sufficient size to hold the necessary amount of retting solution to accommodate the several digesters. When the retting solution is removed from any digester and passed to the agitating or filtering apparatus and said digester is again connected in circuit with the heater, the level of the liquid in the storing-tank $a^5$ will fall correspondingly, and I preferably form the reservoir $a^5$ of sufficient capacity to accommodate this withdrawal of the retting solution from the digesters. In practice the digesters will be operated in successive order. For instance, if there are three digesters and it requires, say, an hour, to ret a bundle of flax one of the digesters will be opened about each twenty minutes, and thus the liquid in the circulating system will be decreased by the quantity of the solution filling the digester every twenty minutes. The reservoir $a^5$ should be made of sufficient capacity to replenish the circulating system until the renewed solution has been returned to the circulating system from the filters.

By providing storing capacity for the heater above the level of the upper communications with the digesters I am enabled to employ any desired number of digesters with a single heater without materially increasing the size of the heater for the increased number of digesters. By operating the digesters in successive order, as above described, but a single digester need be opened at a time for the removal of the completed fiber and for the insertion of a fresh mass of fiber. In designing the plant I first determine the quantity of the retting solution which it may be desired to withdraw from the heater and the circulating system at any time and provide the storing capacity of the heater of sufficient size so that when this quantity of the retting solution is withdrawn the level of the liquid in the heater will still be above the upper communications with the digesters. For instance, supposing it is necessary to withdraw from the heater and circulating system two digesters full of the retting solution I provide the heater with sufficient storing capacity above the level of the upper communications of the digesters to accommodate, say, two and a half or three times the quantity filling a digester, so that when the two digesters full have been withdrawn the level of the liquid in the heater will still be above the upper communications of the digesters. If it be desired to increase the number of digesters supplied from a single heater from four to eight or even to ten, it would not be necessary to withdraw more than, say, two or three digesters full of the liquid from the heater and circulating system at any one time, and by increasing the quantity of liquid in the storing portion of the heater by one digester full the capacity of the system could thus be more than doubled without a corresponding increase of the size of the heater. By the provision of the storing-chamber in the heater I am thus enabled to render the system flexible and to increase or decrease the number of digesters in service without alterating the heater.

In practice when it is desired to remove the fiber from the digesters the digester is disconnected from the heater, and the retting solution is then passed into the storing-reservoir, and when the new mass of fiber has been placed in the digester the digester is again connected with the heater. A digester full of the retting solution is thus withdrawn from the heater and circulating system. The retting solution thus passed to the storing-reservoir is then passed through the filter and back to the heater. It requires, say, fifteen to twenty minutes for the solution to pass through the filter, and during this period the quantity of the solution in the heater and circulating system is reduced in quantity.

I preferably proportion the size of the filter to the quantity of the liquid which may be withdrawn from the heater and the circulating system at any one time, so that the filter will return the retting solution to the heater before the next withdrawal takes place. In this manner the most effective operation and construction of the system may be attained.

I preferably construct the heater so that the heating-coils therein will all lie below the level of the upper communications with the digesters, whereby the heating-coils will always be submerged in the liquid, and the heat therefrom will thus be utilized to the best advantage.

Upon the left in Fig. 9 I have illustrated a reservoir or digester $w$ containing steam-coils $w'$, whereby the interior of the digester may be heated. The digester is provided at the top with a removable cover of the kind illustrated in connection with digesters $d$ and $e$. The digester is connected by piping with the solution-pump $h^2$, whereby liquid may be pumped from the digester $w$ into the heater $a$ and digesters $d$ and $e$. A mass of the fiber being operated upon may be inserted in the digester $w$, which will be filled with water, and the water will thus become saturated with the oils and waxes to provide retting solution of the kind described in my application above referred to. When the mass of fiber is removed from one of the digesters $d$ or $e$ after the same has been retted, a certain amount of the solution will soak into the fiber and will be withdrawn, thus diminishing the quantity of the waxes and oils in the retting solution. The solution thus withdrawn may be compensated for by pumping a quantity of the retting solution from the digester $w$ into the heater $a$. This added solution will contain the gums removed from the fiber, which will be extracted when the retting solution is passed through the agitator and the filter.

Having described my invention, what I claim as new, and desire to secure by Letters Patent, is—

1. The combination with a heater, of a digester connected therewith by upper and lower communications, the upper communications being situated below the level of the liquid in said heater, and a supplemental chamber or receptacle situated above said heater and connected therewith, said chamber being without the circulating system, and adapted to replenish the liquid withdrawn from the heating and circulating system, substantially as described.

2. The combination with a heater, of a plurality of digesters connected therewith by upper and lower communications, the upper communications being situated below the level of the liquid in said heater, and a supplemental chamber or receptacle situated above said heater and out of the path of the circulating liquid and connected therewith, and adapted to replenish the liquid withdrawn from the heating and circulating system, substantially as described.

3. The combination with a heater, of a plurality of digesters connecting said heater with each of said digesters, the upper communications being situated below the level of said liquid, said heater having storing capacity above the level of the upper communications in the form of a separate chamber, and means whereby said separate chamber may be isolated from the heater proper, substantially as described.

4. The combination with a heater, of a digester connected therewith by upper and lower communications, the upper communications being situated below the level of the liquid in the heater, whereby the liquid may circulate between the heater and digester, and a heating-coil contained in said heater, and situated wholly beneath the level of the liquid therein, so as to be continuously submerged, substantially as described.

5. The combination with a heater, of a plurality of digesters connected therewith by upper and lower communications, said heater having storing capacity above the level of said upper communications and a separate storing-reservoir to which the liquid may be passed from any of said digesters, substantially as described.

6. The combination with a heater, of a plurality of digesters, upper and lower communications connecting said heater with each of said digesters, said upper communications being situated below the level of the liquid in said heater, and a separate storing-reservoir to which the liquid may be passed from said digesters.

7. The combination with a heater, of a plurality of digesters, upper and lower communications between said heater and each of said digesters, said upper communications being situated below the level of the liquid in said heater, a separate storing-reservoir, and piping between said storing-reservoir and said heater, and between said storing-reservoir and each of said digesters, substantially as described.

8. The combination with a heater, of a digester connected therewith by upper and lower communications, the upper communications being situated below the level of the liquid in said heater, and a filter to which the liquid is adapted to be passed, said heater having storing capacity above the level of said upper communications sufficient to replenish the liquid withdrawn for passage through the filter, substantially as described.

9. The combination with a heater, of a plurality of digesters, upper and lower communications connecting said heater with each of said digesters, said upper communications being situated below the level of the liquid in said heater, and a filter through which the liquid is adapted to be passed, said heater having sufficient storing capacity above the level of said upper communications to replenish the liquid withdrawn from the heating and circulating system for passage through said filter, substantially as described.

10. The combination with a heater, of a plurality of digesters, upper and lower communications connecting said heater with each of said digesters, said upper communications being situated below the level of the liquid in said heater, said heater having storing capacity above the level of said upper communications, a storing-reservoir to which liquid may be passed from any of said digesters, and a filter through which the liquid may be passed, substantially as described.

11. The combination with a heater, of a plurality of digesters, upper and lower communications connecting said heater with each of said digesters, said upper communications being situated below the level of the liquid in said heater, said heater having storing capacity above the level of said upper communications, a storing-reservoir to which liquid may be passed from any of said digesters, a filter connected with said storing-reservoir and a communication between said filter and said heater, substantially as described.

12. The combination with a heater, of a plurality of digesters, upper and lower communications connecting said heater with each of said digesters, said upper communications being situated below the level of the liquid in said heater, said heater having storing capacity above the level of the said upper communications and a filter communicating with said digesters and heater, and adapted to filter the liquid with sufficient rapidity to return the liquid to the heater before the level of the liquid in the heater falls below said upper communications, substantially as described.

13. The combination with a heater, of a plurality of digesters, upper and lower communications connecting said heater with each of said digesters, said upper communications being situated below the level of the liquid in said heater, said heater having storing capacity above the level of said upper communications, a storing-reservoir communicating with said digesters, and a filter communicating with said storing-reservoir and said heater, and adapted to filter the liquid with sufficient rapidity to return the liquid to the heater before the level of the liquid therein has fallen below the level of the upper communications, substantially as described.

14. The combination with a heater, of a digester, upper and lower communications connecting said heater and said digester, the upper communications being situated below the level of the liquid in said heater, the liquid above said upper communications taking no part in the circulation, a separate chamber for the liquid above the level of said upper communications, and a filter communicating with said heater and digester, substantially as described.

15. The combination with a heater, of a plurality of digesters, upper and lower communications connecting said heater with each of said digesters, said upper communications being situated below the level of the liquid in said heater, the liquid above the said upper communications taking no part in the circulation, a separate chamber for containing the liquid above said upper communications and a filter communicating with said heater and with said plurality of digesters, substantially as described.

16. The combination with a digester, of an agitating-chamber communicating therewith and a filter communicating with said agitating-chamber, substantially as described.

17. The combination with a heater, of a digester connected therewith, an agitating-chamber connected with said digester and a filter connected with said agitating-chamber, substantially as described.

18. The combination with a heater, of a digester connected therewith, an agitating-chamber connected with said digester, a filter connected with said agitating-chamber, and a communication between said filter and said heater, substantially as described.

19. An agitating-chamber, means therein for producing a rotary and a longitudinal movement of the liquid, and means for checking said rotary and longitudinal movement of the liquid throughout the entire course which said liquid pursues, substantially as described.

20. An agitating-chamber, a screw conveyer therein, baffling-plates for causing the liquid to flow in a sinuous path through said chamber, and means for operating said screw conveyer, substantially as described.

21. An agitating-chamber, a screw conveyer and baffling-plates provided therein, said baffling-plates carrying blades, substantially as described.

22. The combination with a digester, of an agitating-chamber, means provided in connection with said agitating-chamber for permitting the flow of liquid therethrough while retaining in said chamber pulverized or solid material, a filter and communications between said digesters, agitating-chamber and filter, substantially as described.

23. The combination with a digester adapted to receive the retting liquid, of an agitating-chamber in which said retting liquid is adapted to be commingled, with a precipitating agent, means provided in connection with said agitating-chamber for retaining therein the precipitating agent while permitting the retting liquid and the precipitate to pass therefrom, and a filter through which said liquid is adapted to be passed to separate the precipitate therefrom, substantially as described.

24. The combination with a heater and a digester, and upper and lower communications connecting said heater and said digester, said upper communications being situated below the level of the liquid in said heater, of a supplemental digester connected therewith, substantially as and for the purpose set forth.

In witness whereof I have hereunto subscribed my name in the presence of two witnesses.

BERTRAND S. SUMMERS.

Witnesses:
H. R. KINGMAN,
W. CLYDE JONES.